United States Patent [19]

Valdespino et al.

[11] 4,174,094
[45] Nov. 13, 1979

[54] RECREATIONAL VEHICLE LEVELING AND SUPPORT SYSTEM

[76] Inventors: Joseph M. Valdespino, 5023 Golf Club Pkwy.; Ronald A. Brandl, 3040 N. Pine Hills Rd., both of Orlando, Fla. 32808

[21] Appl. No.: 874,852

[22] Filed: Feb. 3, 1978

[51] Int. Cl.² ............................................... B60S 9/02
[52] U.S. Cl. .................................................. 254/86 H
[58] Field of Search ................. 254/86 H, 45, 93 R, 254/93 VA

[56] References Cited

U.S. PATENT DOCUMENTS

| 1,719,740 | 7/1929 | Williams | 254/86 H |
| 2,356,623 | 8/1944 | Schmitt | 254/86 H |
| 2,472,294 | 6/1949 | Hall | 254/86 H |
| 2,819,766 | 1/1958 | Bisceglie | 254/86 H |

*Primary Examiner*—Robert C. Watson
*Attorney, Agent, or Firm*—Duckworth, Hobby, Allen & Pettis

[57] ABSTRACT

A leveling and support system for recreational vehicles operates on a plurality of telescoping air cylinders. Leveling is accomplished through a separate valve in the line for each cylinder, each valve being mounted adjacent the others, and adjacent an electrical switch which operates a DC motor in either a forward or a reverse direction. The motor actuates a rotary air compressor in a forward or reverse direction for changing the air pressure from positive to negative while operating each of the valves to each cylinder line.

5 Claims, 8 Drawing Figures

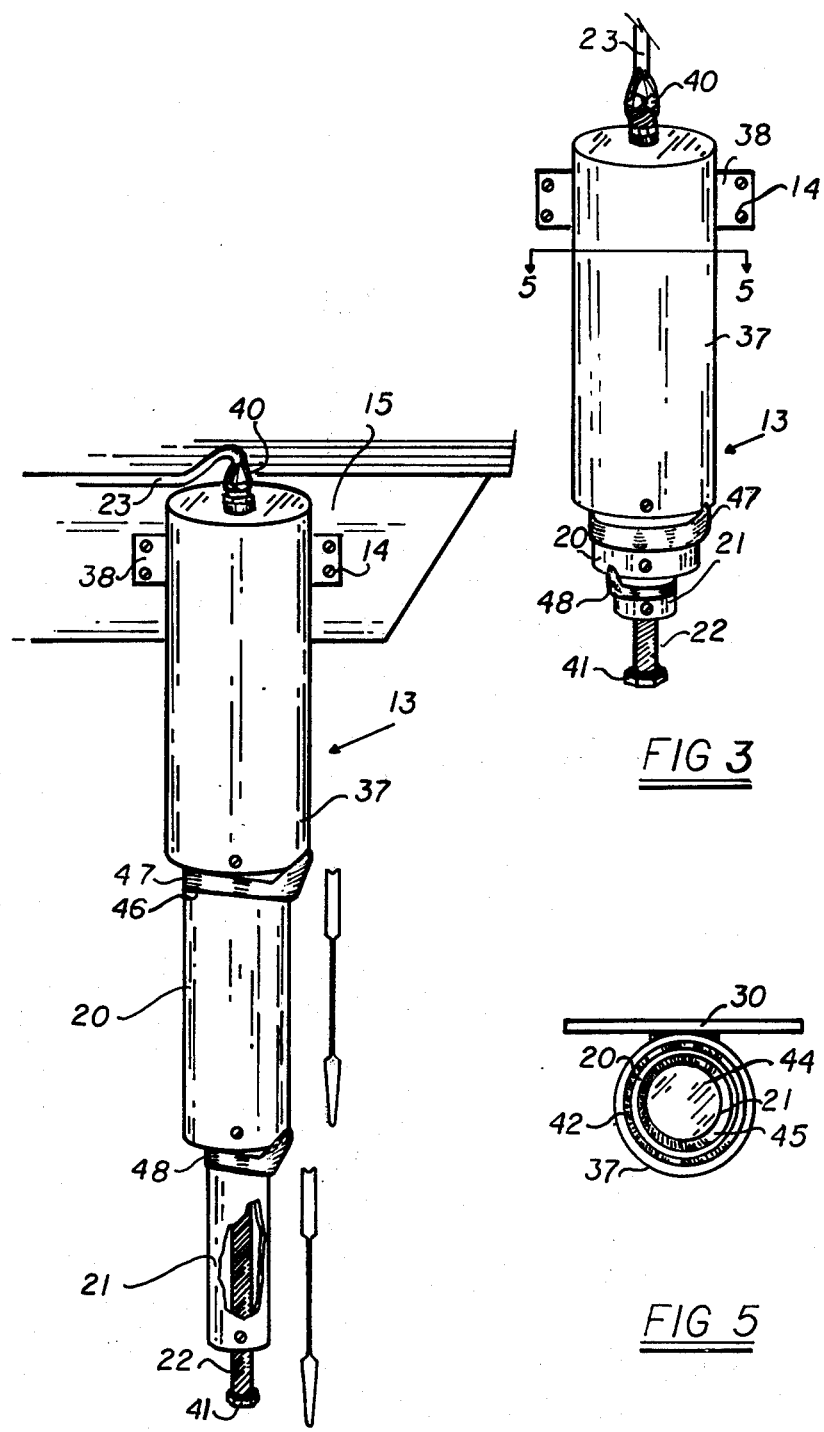

RECREATIONAL VEHICLE LEVELING AND SUPPORT SYSTEM

BACKGROUND OF THE INVENTION

1. Field of the Invention

The present invention relates to recreational vehicles and especially to a system for leveling and supporting a recreational vehicle with positive and negative air pressure.

2. Description of the Prior Art

A variety of recreational vehicles are available on the market, including small and large campers for attachment to the back of a family automobile for camping for short or extended periods of time, large motor homes, and fifth wheel campers, which do not have front wheels, and are suspended by a fifth wheel to the back of a pickup truck. This latter vehicle requires front end support when disconnected from the truck. One of the problems encountered by most recreational vehicles is supporting the front end or tongue of the camper when the recreational vehicle is disconnected from the family car or other towing vehicle. The support must be adjustable to allow the vehicle to be adjusted for different heights to maintain the inside of the recreational vehicle level. In addition, on the smaller campers, the springs are such that the campers tend to be unstable, and shake considerably when positioned in a campground, or the like. These problems are dealt with by hand actuated jacks, which may be placed under the tongue of the camper, or mounted to the front portion of a fifth wheel camper, and which may be hand actuated to raise and lower the front portion of the vehicle. On smaller campers that tend to be unstable, a series of smaller hand operated jacks are sometimes positioned on the four corners, and each jack operated to get the camper level and supported by the jacks so that the camper will not rock when walking from one side of the camper to the other. In addition to hand actuated jacks that are commonly used or supplied with recreational vehicles, auxiliary jacks have been available which are actuated by electric motors for raising and lowering a portion of the vehicle. These require connection to electrical power, and are expensive to purchase as an option to the recreational vehicle. Finally, large semi-trailers have fifth wheels having air over hydraulic jacks for supporting the trailers when disconnected from the cab portion, which are actuated by the truck's air system.

Typical prior patents may be seen in U.S. Pat. No. 3,350,063 for a hydraulic jack for camper bodies, in which a hydraulic jack may be swung from the side of a camper body mounted on a pickup truck for supporting the camper body while driving the pickup from under the camper body, and in U.S. Pat. No. 3,415,490 for a lift jack apparatus having a hand actuated jack for supporting camper bodies. U.S. Pat. No. 3,360,141 teaches a container lifting means and method using a hydraulically actuated container lifter, while U.S. Pat. No. 3,338,554 illustrates a screw jack actuated from a pickup loaded camper body for lifting the camper body portion.

The present invention, on the other hand, provides a simple series of air cylinders permanently attached to the recreational vehicle and which may be telescoping, so that they are permanently locked into position, and which can be raised or lowered individually by the positive and negative air pressure applied to each individual cylinder. The cylinders are controlled by having each of the valves for each of the cylinders mounted adjacent each other and having an electrical switch mounted adjacent thereto, which actuates an electrical compressor in a forward or reverse direction for generating a positive and negative air pressure in a manifold, which is then applied to individual cylinders for adjusting the cylinder, and thereby allows the raising of the cylinder when needed.

SUMMARY OF THE INVENTION

A recreational vehicle leveling system has a plurality of air cylinders having slidable cylinder rods therein, along with a DC motor driven rotary compressor connected to an electrical power source. The compressor is connected by air lines to a manifold, which is connected to each of the plurality of cylinders through individual cylinder valves, while the DC motor driven compressor is switched from a point adjacent the individual valves to drive the motor in a forward or reverse direction, thereby generating a positive or negative pressure with the compressor in the manifold for actuating individual cylinders to raise or lower the individual cylinder. The telescoping cylinders have one cylinder with a second cylinder slidably mounted therein, and a third cylinder slidably mounted in the second cylinder, but closed to the second and first cylinder. The third cylinder may have a long threaded bolt mounted through the end thereof for further adjustment of the cylinders, and each cylinder is fixedly attached to the chassis of the recreational vehicle, and may have clamping means for locking the cylinder in position once the vehicle is leveled.

BRIEF DESCRIPTION OF THE DRAWINGS

Other objects, features, and advantages of the present invention will be apparent from the written description and the drawings, in which:

FIG. 3 is a perspective view of a telescoping cylinder in accordance with the present invention;

FIG. 4 is a telescoping cylinder in accordance with FIG. 3, in an extended position with a fragmentary of a threaded extension;

FIG. 5 is a sectional view taken on the line 5—5 of FIG. 3;

DESCRIPTION OF THE PREFERRED EMBODIMENT

Figure 2:
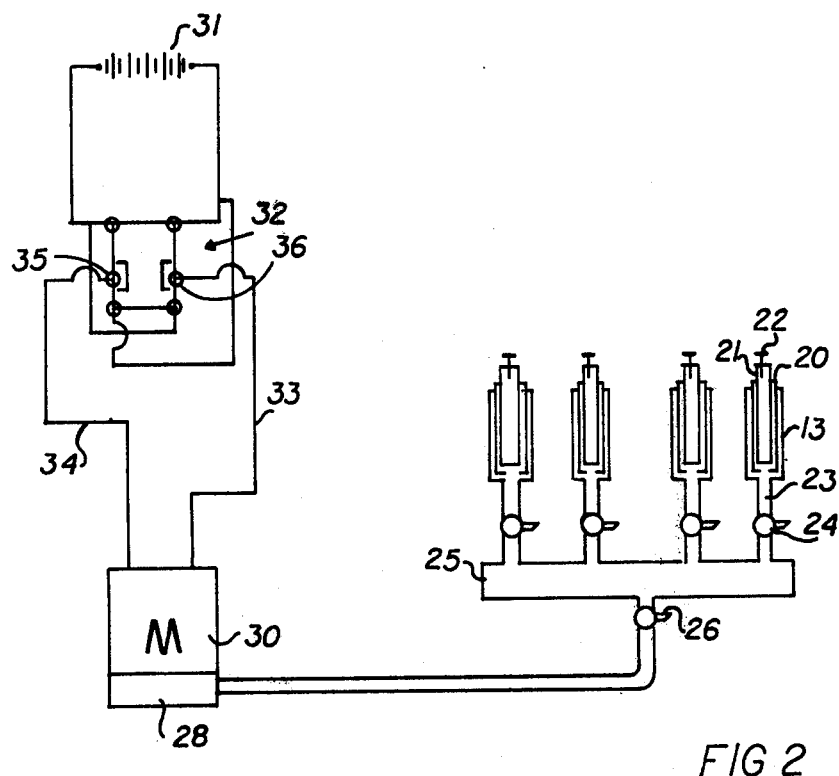
FIG. 2 is a schematic diagram of the air system in accordance with the present invention.

Referring to the drawings, a recreational vehicle 10 is illustrated having wheels 11 and a fifth wheel support 12 along with a pair of front supporting cylinders 13. Cylinders 13 are bolted with bolts 14 to the chassis 15 and have telescoping rods. The camper 10 may have a control panel 16 mounted thereon, having an electrical switch 17, and a plurality of air switches 18 for operating the air cylinders 13 for loading and leveling the camper 10.

Figure 1:
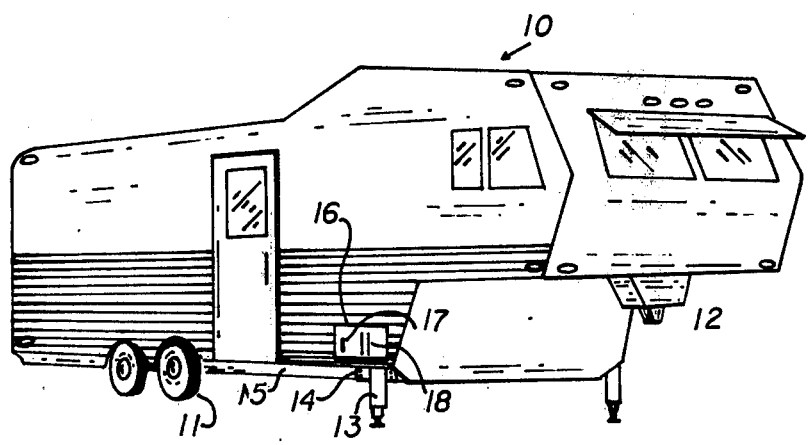
FIG. 1 is a perspective view of the recreational vehicle incorporating a preferred embodiment of the present invention.

In FIG. 2, the operation of the air system in accordance with the present invention is illustrated, in which a plurality of telescoping cylinders 13 each have a first telescoping section 20, a second telescoping section 21 and an adjustable threaded section 22. Each cylinder 13 is connected by an air line 23 through an air valve 24 which is actuated by handle 18 in the control panel 16 of FIG. 1. The air line 23 is connected to a manifold 25 which in turn is connected through a valve 26 and an air line 27 to a rotary compressor 28. The rotary compressor is connected to a DC electric motor 30, which may run from a 12 volt battery 31 connected through a double pole double throw switch 32. The switch may be held in a neutral position, and is connected through electrical lines 33 and 34 to the contacts 35 and 36, and may be switched to reverse the DC current applied to the motor 30, whereby the motor can be run in a forward or reverse direction, depending upon the polarity of the applied voltage. Thus, the rotary air compressor 28 can run in a forward or reverse direction, thereby generating either a positive air pressure or a negative air pressure in the line 27 and in the manifold 25. The switch has a handle 17 mounted in the control panel 16 so that operating of the switch back and forth allows a positive and negative pressure to be applied to the manifold 25, and by operating individual valves 24, individual cylinders 13 can be raised and lowered by the movement of the two valves to level a recreational type vehicle, and then closing the valve 24 to lock it in place. Once it is locked in place, tilting locking members or clamps 46 and 48 can be applied to lock the cylinders in the pre-determined position, so that a leakage of air will not allow the recreational vehicle to slump out of position.

FIGS. 3 and 4 more clearly illustrate the operation of the cylinders 13, which have a main cylindrical body 37 having flanges 38 with bolts 14 for attaching the main cylindrical housing 37 to the chassis 15 of the recreational vehicle. An air line 23 is connected by a coupling 40 to the main housing 37, and the first telescoping cylinder 20 has a second telescoping cylinder 21 slidably mounted therein, and a threaded extension 22 having a footing 41 threaded into cylinder 21. In operation, when air is applied through the line 23 to the main housing 37, the extensions 20 and 21 extend their full length, or a portion thereof, and the threaded extension 22 can be adjusted as desired for any length. The threaded extension 22 extends most of the length of the telescoping portion 21, as illustrated in FIG. 4. Since the cylinder 21 does not have air applied therein, but has a smooth solid surface to which the air pressure is applied, the cylinder 21, however is open on its inside end to allow air pressure to be applied thereinside to apply pressure against the surface. In FIG. 5, the main casing 37 has the telescoping cylinder 20 sliding therein, with an O-ring seal 42 therebetween to prevent the escape of air between the sides. The top 43 of the cylinder 21 is seen as a solid surface, but has an O-ring seal 45 between the cylinders 21 and 20. Thus, the application of air pressure will apply pressure against the surface 44, which will extend its full length, then continue to apply pressure against the surface 44 to extend the cylinder 20 its full length. A flanged portion 38 is welded to the casing 37 for bolting the casing to the chassis. Once the cylinders are extended, a first tilting locking member 46 attached to the cylinder 20 is slid up on the cylinder and cocks to lock the cylinder 20 in position relative to the casing 37, while a second tilting locking member 48 may be raised and tilted to hold the cylinder 20 in a pre-determined position, so that upon the loss of air pressure in the cylinders 13, the recreational vehicle will hold in position. When it is time to raise the cylinders, the locks 46 and 48 are loosened, and the valves 24 and the switch 32 are actuated in sequence to raise the cylinders which can be held in position by the negative air pressure, or by locking the tilt locks 46 and 48.

Figure 6:
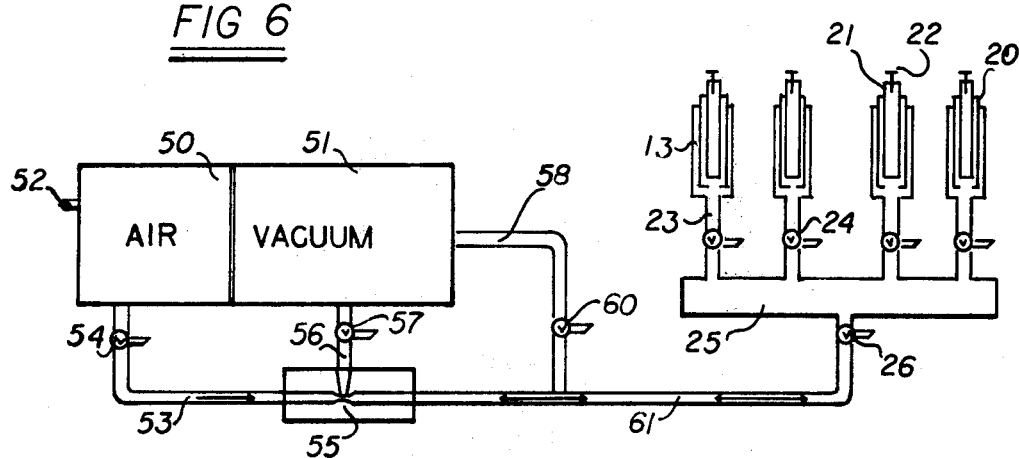
FIG. 6 is a schematic diagram of a second embodiment for the air system.

FIG. 6 shows a second embodiment for driving the air cylinders 13 through the lines 23 and valves 24 utilizing the manifold 25 and having a master shut-off valve 26 in the line. Line 61 is connected to an air pressure tank 50, which is filled with air through an inlet valve 52 and which may work at a very high pressure, if desired. Air is released from the tank 50 through the control valve 54 through a line 53 and through a venturi valve 55 to a line 61. Air passing through the venturi valve 51 creates a suction in the line 56 connected to the venturi, thereby generating a vacuum or negative pressure in the tank 51. A check valve 57 prevents air from escaping from the vacuum tank 51 when the valve 54 is shut off. Air from the tank 50 can be used to drive the cylinders 13 by the control of the valve 54, and the individual valves 24 in one direction, and the negative pressure generated in the tank 51 can be actuated through a control valve 60 through the line 58, and with the valve 24 to return the pistons 13. Thus, a leveling system in accordance with the embodiment of FIG. 6 requires only that the tank 50 be filled to pre-determined air pressure for actuation of the cylinders 13 in either direction.

Figure 7:
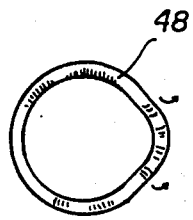
FIG. 7 is an elevation of a cylinder locking member.
Figure 8:
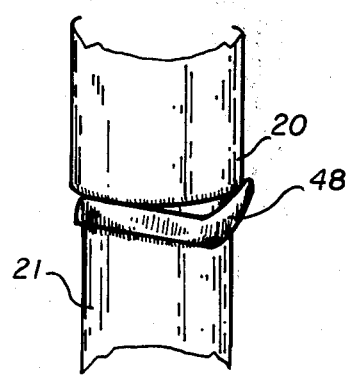
FIG. 8 is a fragmentary elevation of a cylinder having the locking member of FIG. 7 thereon.

FIGS. 7 and 8 more clearly show the locking ring 48 which is attached around cylinder 21 in FIG. 8, and cocked against cylinder 20, thereby positioning the member 48 at a tilt or angle, and preventing the telescoping of the cylinder 21 back into the cylinder 20.

It should be clear at this point that a leveling and support system for a recreational vehicle has been provided, which advantageously utilizes telescoping cylinders which do not require the swinging of the cylinders out of position or into position for actuating the cylinders, but which advantageously allows the operating from a single point of a plurality of cylinders mounted to a recreational vehicle chassis or body. However, it should be clear that variations in the cylinder and the cylinder clamps, as well as the actuation of the motor and compressor for generating positive and negative pressures, are contemplated as being within the scopy of the invention. In addition, the cylinders 13 can be made of steel, aluminum, or even a polymer material without departing from the scope of the invention. Accordingly, the present invention is not to be construed as limited to the particular forms disclosed herein, which are to be regarded as illustrative rather than restrictive.

We claim:

1. A recreational vehicle leveling system comprising in combination:

a plurality of fluid cylinders each having at least two telescoping rods, the first rod being mounted in the cylinder casing, and the second rod being mounted in the casing of the first rod to telescope the cylinders from the main casing;

an electrical power source;

electrical motor driven compressor connected to said electrical power source;

valve means operatively connected between said compressor and each said fluid cylinder, said valve means having a manifold connected to said compressor and having a plurality of air lines extending therefrom, each air line having an individual valve therein operated by a valve handle and each air line being connected to one of said plurality of fluid cylinders;

means to reverse the pressure applied to said valve means by said compressor from a positive to a negative pressure, whereby said slidable cylinders can be driven in two directions by the air pressure applied thereto and said means to reverse the pressure applied to said valve means, and said valve means operating handles being located in a panel adjacent each other, whereby each said cylinder can be operated in either direction from a central point; and means for locking each said air cylinder in position following the leveling of said recreational vehicle said means for locking each said cylinder having a pair of locking clamps located on each cylinder.

2. The apparatus in accordance with claim 1, in which said electric motor driven compressor is a reversible rotary air compressor, driven by a DC motor.

3. The apparatus in accordance with claim 2, in which said means to reverse the pressure applied to said valve means includes an electrical switch for reversing the electric motor to reverse the direction of rotation of the motor and thereby reverse the compressor to apply either positive or negative pressure by the operation of the electrical switch.

4. The apparatus in accordance with claim 3, in which a master valve is connected between said manifold and said compressor for locking all the cylinders simultaneously.

5. The apparatus in accordance with claim 4, in which said second extendable cylinder in said telescoping cylinders has one solid end for applying air pressure thereagainst, and has a threaded extension member extending into the other end for extending the end of the cylinder, whereby additional adjustments may be made to the length of the cylinders.

* * * * *